United States Patent
Watfa et al.

(10) Patent No.: US 11,924,632 B2
(45) Date of Patent: Mar. 5, 2024

(54) NETWORK SLICE-SPECIFIC AUTHENTICATION AND AUTHORIZATION

(71) Applicant: Samsung Electronics Co., Ltd., Suwon-si (KR)

(72) Inventors: Mahmoud Watfa, Staines (GB); Ricky Kumar Kaura, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 17/328,959

(22) Filed: May 24, 2021

(65) Prior Publication Data

US 2021/0368339 A1    Nov. 25, 2021

(30) Foreign Application Priority Data

May 22, 2020   (GB) ...................................... 2007738
May 5, 2021    (GB) ...................................... 2106419

(51) Int. Cl.
*H04W 12/06*   (2021.01)
*H04W 84/04*   (2009.01)

(52) U.S. Cl.
CPC .......... *H04W 12/06* (2013.01); *H04W 84/042* (2013.01)

(58) Field of Classification Search
CPC ... H04W 12/06; H04W 84/042; H04W 12/08; H04W 60/00; H04W 8/18; H04W 76/11; H04W 48/02; H04W 48/18; H04W 80/10
See application file for complete search history.

(56) References Cited

U.S. PATENT DOCUMENTS

| | | | |
|---|---|---|---|
| 2016/0345243 A1* | 11/2016 | Zaus | ................... H04W 48/18 |
| 2019/0028941 A1 | 1/2019 | Zee et al. | |
| 2019/0373520 A1 | 12/2019 | Sillanpaa | |
| 2020/0163008 A1 | 5/2020 | Hedman et al. | |
| 2020/0267554 A1* | 8/2020 | Faccin | ................. H04L 63/101 |

FOREIGN PATENT DOCUMENTS

| | | |
|---|---|---|
| GB | 2595751 A | 12/2021 |
| WO | 2020/074062 A1 | 4/2020 |
| WO | 2021/162487 A1 | 8/2021 |

OTHER PUBLICATIONS

Huawei et al., Clarification on handling of pending NSSAI,C1-202871, 3GPP TSG-CT WGI Meeting #123-e, Apr. 23, 2020, pp. 2-13 (Year: 2020).*
Huawei et al., Clarification on handling of pending NSSAI, C1-202871, 3GPP TSG-CT WGI Meeting #123-e, Apr. 23, 2020, pp. 2-13 (Year: 2020).*

(Continued)

*Primary Examiner* — Brandon J Miller (57) ABSTRACT

There is disclosed a method for a user equipment (UE) in a wireless communication system, receiving pending network slice selection assistance information (NSSAI) including one or more single NSSAIs (S-NSSAIs), and applying the received pending NSSAI to at least one second public land mobile network (PLMN) in a registration area, wherein the UE is assigned to the registration area comprising two or more tracking areas (TAs) including at least a first set of TAs belonging to a first public land mobile network (PLMN) to which the UE is registered.

10 Claims, 3 Drawing Sheets

(56) References Cited

OTHER PUBLICATIONS

United Kingdom Intellectual Property Office, "Combined Search and Examination Report under Sections 17 & 18(3)" dated Nov. 3, 2021, in connection with counterpart Patent Application No. GB2106419.1, 15 pages.

Huawei et al., "Clarification on Allowed NSSAI when registered over several accesses simultaneously" 3GPP TSG-SA WG2 Meeting #126, S2-182181(revision of S2-180127), Montreal, Canada, Feb. 26-Mar. 2, 2018, 5 pages.

3GPP TS 24.501 V16.2.0 (Sep. 2019); Technical Specification; 3rd Generation Partnership Project (3GPP); Non-Access-Stratum (NAS) protocol for 5G System (5GS); Stage 3; (Release 16); 611 pages.

"3rd Generation Partnership Project; Technical Specification Group Services and System Aspects; System architecture for the 5G System (5GS); Stage 2 (Release 16)", 3GPP TS 23.501 V16.4.0 (Feb. 2020), 430 pages.

"3rd Generation Partnership Project; Technical Specification Group Services and System Aspects; Procedures for the 5G System (5GS); Stage 2 (Release 16)", 3GPP TS 23.502 V16.4.0 (Mar. 2020), 582 pages.

"3rd Generation Partnership Project; Technical Specification Group Core Network and Terminals; Non-Access-Stratum (NAS) protocol for 5G System (5GS); Stage 3; (Release 16)", 3GPP TS 24.501 V16.4.1 (Mar. 2020), 666 pages.

"3rd Generation Partnership Project; Technical Specification Group Services and System Aspects; Security architecture and procedures for 5G system; (Release 16)", 3GPP TS 33.501 v16.2.0 (Mar. 2020), 227 pages.

Huawei et al., "Clarification on handling of pending NSSAI", Change Request, 3GPP TSG-CT WG1 Meeting #123-e, Apr. 16-24, 2020, C1-202871, 33 pages.

International Search Report dated Oct. 8, 2021 in connection with International Patent Application No. PCT/KR2021/006457, 4 pages.

Written Opinion of the International Searching Authority dated Oct. 8, 2021 in connection with International Patent Application No. PCT/KR2021/006457, 5 pages.

Combined Search and Examination Report dated Apr. 24, 2023, in connection with United Kingdom Patent Application GB2305266.5, 5 pages.

Combined Search and Examination Report dated Apr. 24, 2023, in connection with United Kingdom Patent Application GB2305264.0, 5 pages.

European Patent Office, "Supplementary European Search Report," dated Aug. 24, 2023, in connection with European Patent Application No. 21809493.6, 10 pages.

Samsung et al., "Pending NSSAI and equivalent PLMNs," 3GPP TSG-CT WG1 Meeting #124-e, C1-204191, Jun. 2020, 31 pages.

\* cited by examiner

ASSIGNMENT OF TAs TO REGISTRATION AREA BASED UPON ALLOWED NSSAI

| ALLOWED NSSAI | LIST OF TAs THAT MAKE UP THE REGISTRATION AREA |
|---|---|
| S-NSSAI-1, S-NSSAI-2, S-NSSAI-3 | TA#3, TA#6, TA#9 |
| S-NSSAI-1, S-NSSAI-2 | TA#1, TA#2, TA#3, TA#4, TA#5, TA#6, TA#7, TA#9 |
| S-NSSAI-1, S-NSSAI-3 | TA#1, TA#2, TA#3, TA#4, TA#6, TA#7, TA#8, TA#9 |
| S-NSSAI-2, S-NSSAI-3 | TA#3, TA#4, TA#5, TA#6, TA#7, TA#8, TA#9 |
| S-NSSAI-1 | TA#1, TA#2, TA#3, TA#4, TA#6, TA#9 |
| S-NSSAI-2 | TA#3, TA#4, TA#5, TA#6, TA#7, TA#9 |
| S-NSSAI-3 | TA#3, TA#6, TA#7, TA#8, TA#9 |

NETWORK SLICE-SPECIFIC AUTHENTICATION AND AUTHORIZATION

CROSS-REFERENCE TO RELATED APPLICATIONS

This application is based on and claims priority under 35 U.S.C. § 119(a) to United Kingdom Patent Application No. 2007738.4 filed on May 22, 2020 and United Kingdom Patent Application No. 2106419.1 filed on May 5, 2021 in the United Kingdom Patent Office, the disclosures of which are herein incorporated by reference in their entirety.

BACKGROUND

1. Field

Certain examples of the present disclosure provide methods, apparatus and systems for performing authentication and authorization in a network. For example, certain examples of the present disclosure provide methods, apparatus and systems for performing NSSAA in 3GPP 5G.

2. Description of the Related Art

Various acronyms, abbreviations and definitions used in the present disclosure are defined at the end of this description.

In 3GPP 5GS, the following are defined (e.g., in 3GPP standard specification). A network slice (NS) is defined as a logical network that provides specific network capabilities and network characteristics. A network slice instance (NSI) is defined as a set of network function instances and the required resources (e.g., compute, storage and networking resources) which form a deployed NS. A network function (NF) is defined as a 3GPP adopted or 3GPP defined processing function in a network, which has defined functional behaviour and 3GPP defined interfaces. A NS may be identified by single network slice selection assistance information (S-NSSAI).

Overview of Registration Area and Equivalent PLMNs Applied to Slicing

The AMF assigns a registration area to the UE during the registration procedure as described in the 3GPP standard specification. This consists of a list of tracking area identifiers (TAIs) that can serve the UE in that registration area. and each of these tracking areas consists of one or more cells that cover a geographical area.

PLMNs which have equivalent service functionality to other PLMNs are termed equivalent PLMNs. These PLMNs are regarded by the UE as equivalent to each other for PLMN selection and cell selection/re-selection. When the AMF returns a list of TAIs to the UE during the registration procedure, this list may consist of TAIs of PLMNs equivalent to the registered PLMN, as well as TAIs of the registered PLMN.

Figure 1A:
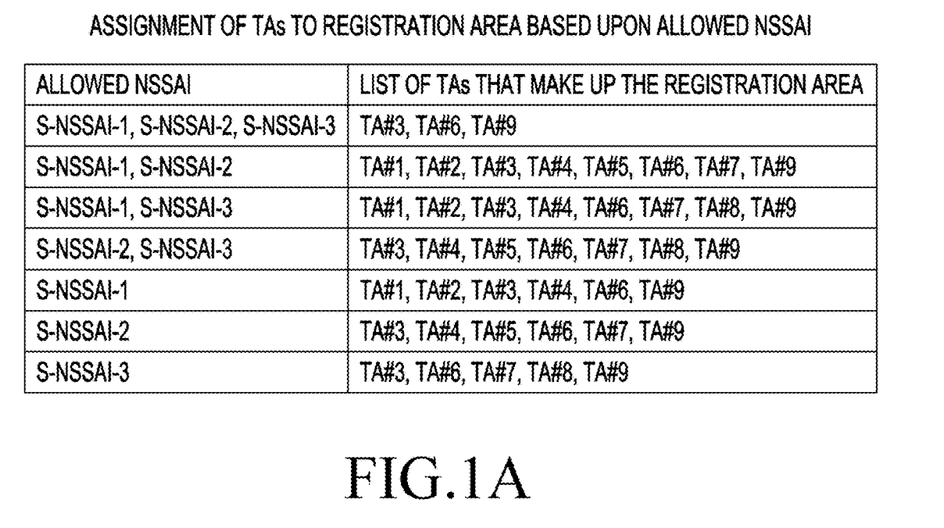
FIG. 1a is a table showing an exemplary assignment of TAs to registration area based upon allowed NSSAI.
Figure 1B:
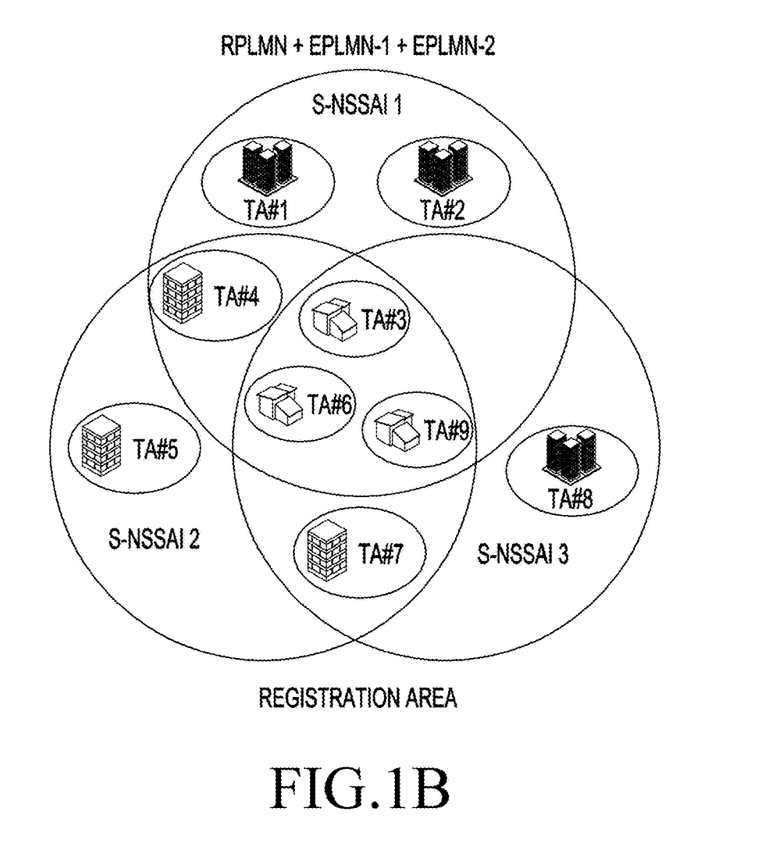
FIG. 1b illustrates the relationship between TAIs of registration area and allowed NSSAI.

When the UE requests registration to a set of slices, the network provides an allowed NSSAI back to the UE and provides a set of tracking areas that can serve all the slices in the allowed NSSAI for that particular registration area. If there are PLMNs that are equivalent to the registered PLMN, then the tracking areas identifiers of equivalent PLMNs that are able to serve all the slices in the allowed NSSAI are also sent back to the UE. FIGS. 1a and 1b provide an example of the assignment of TAIs to the registration area based upon the set of S-NSSAIs allowed for the UE, where the set of TAIs are made up of TAIs from the registered PLMN and equivalent PLMNs.

In the example of FIGS. 1a and 1b, when the network returns back an allowed NSSAI of {S-NSSAI-1, S-NSSAI-2, S-NSSAI-3), then the TAI-list returned is TA #3 (registered PLMN), TA #6 (EPLMN1) and TA #9 (EPLMN2). Furthermore, when the UE registers within the RPLMN and receives the allowed NSSAI, this allowed NSSAI is stored for the RPLMN and stored separately for each of the EPLMNs. Thus, in the above example the allowed NSSAI is stored for the RPLMN and separately for EPLMN1 and EPLMN2.

This is stated in the 3GPP standard specification as shown in TABLE 1.

TABLE 1

| |
|---|
| If the REGISTRATION ACCEPT message contains the allowed NSSAI, then the UE shall store the included allowed NSSAI together with the PLMN identity of the registered PLMN and the registration area as specified in subclause 4.6.2.2. If the registration area contains TAIs belonging to different PLMNs, which are equivalent PLMNs, the UE shall store the received allowed NSSAI in each of allowed NSSAIs which are associated with each of the PLMNs. |

The statement above means that the UE can go ahead and use the allowed NSSAI in an equivalent PLMN (ePLMN) directly without requesting explicitly. This can occur when the UE in 5GMM-CONNECTED mode with RRC inactive indication reselects into an ePLMN for which the TAI is already in the UE's registration area. As the TAI is already authorized, the UE need not register and can hence directly transition to connected mode with the service request procedure and subsequently request a PDU session for a slice that is in the UE's allowed NSSAI (which is applicable to this ePLMN).

Overview of Network Slice-Specific Authentication and Authorization (NSSAA)

NSSAA was introduced as part of Rel-16 in 3GPP. The feature enables the network to perform slice-specific authentication and authorization for a set of S-NSSAI(s) to ensure that the user is allowed to access these slices. The procedure is executed after the 5GMM authentication procedure has been completed and also after the registration procedure completes. The high-level description of the feature can be found in the 3GPP standard specification whereas further details can be found in the 3GPP standard specifications. Certain features of the NSSAA procedure are summarized below.

The NSSAA procedure is access independent. That is, if a slice is successfully authorized, then the NSSAA procedure is considered as authorized for both access types (i.e., 3GPP and non-3GPP access type). The term "authorized" may be regarded as meaning that slice-specific authentication/authorization has succeeded for a particular S-NSSAI. However, this does not mean that the S-NSSAI is allowed to be used in the UE's current tracking area (TA) over the 3GPP access.

When the UE registers with the network, the UE may include a requested NSSAI in the registration request message if available at the UE. The following describes the network behaviour as specified in the 3GPP standard specification as shown in TABLE 2.

TABLE 2

If the UE indicated the support for network slice-specific authentication and authorization, and if the Requested NSSAI IE includes one or more S-NSSAIs subject to network slice-specific authentication and authorization, the AMF shall in the REGISTRATION ACCEPT message include:
    a) the allowed NSSAI containing the S-NSSAI(s) or the mapped S-NSSAI(s), if any:
        1) which are not subject to network slice-specific authentication and authorization and are allowed by the AMF; or
        2) for which the network slice-specific authentication and authorization has been successfully performed; and
    b) optionally, the rejected NSSAI due to the failed or revoked NSSAA;
    c) pending NSSAI containing one or more S-NSSAIs for which network slice-specific authentication and authorization will be performed, if any; and
    d) the "NSSAA to be performed" indicator in the 5GS registration result IE set to indicate whether network slice-specific authentication and authorization procedure will be performed by the network, if the allowed NSSAI is not included in the REGISTRATION ACCEPT message.

If the UE indicated the support for network slice-specific authentication and authorization, and if:
    a) the UE did not include the requested NSSAI in the REGISTRATION REQUEST message or none of the S-NSSAIs in the requested NSSAI in the REGISTRATION REQUEST message are allowed; and
    b) all subscribed S-NSSAIs marked as default are subject to network slice-specific authentication and authorization;
the AMF shall in the REGISTRATION ACCEPT message include:
    a) the "NSSAA to be performed" indicator in the 5GS registration result IE to indicate whether network slice-specific authentication and authorization procedure will be performed by the network; and
    b) pending NSSAI containing one or more subscribed S-NSSAIs marked as default for which network slice-specific authentication and authorization will be performed.

If the UE indicated the support for network slice-specific authentication and authorization, and if:
    a) the UE did not include the requested NSSAI in the REGISTRATION REQUEST message or none of the S-NSSAIs in the requested NSSAI in the REGISTRATION REQUEST message are allowed; and
    b) one or more subscribed S-NSSAIs marked as default are not subject to network slice-specific authentication and authorization;
the AMF shall in the REGISTRATION ACCEPT message include:
    a) pending NSSAI containing one or more subscribed S-NSSAIs marked as default which are subject to network slice-specific authentication and authorization, if any; and
    b) allowed NSSAI containing one or more subscribed S-NSSAIs marked as default which are not subject to network slice-specific authentication and authorization.

When the UE does not have an allowed NSSAI, due to ongoing NSSAA, the UE is not allowed to get services with a few exceptions. For example, the following is described in the 3GPP standard specification as shown in TABLE 3.

TABLE 3

If the REGISTRATION ACCEPT message:
    a) includes the 5GS "NSSAA to be performed" indicator in the 5GS registration result IE;
    b) includes a pending NSSAI; and
    c) does not include an allowed NSSAI;
    the UE:
    a) shall not perform the registration procedure for mobility and registration update with the Uplink data status IE except for emergency services or for high priority access;
    b) shall not initiate a service request procedure except for emergency services, high priority access or for responding to paging or notification over non-3GPP access;
    c) shall not initiate a 5GSM procedure except for emergency services, high priority access, indicating a change of 3GPP PS data off UE status, or to request the release of a PDU session; and
    d) shall not initiate the NAS transport procedure to send a CIoT user data container except for sending user data that is related to an exceptional event.
until the UE receives an allowed NSSAI.

NSSAA can be re-initiated at any time as specified in the 3GPP standard specification as shown in TABLE 4.

TABLE 4

This procedure can be invoked for a supporting UE by an AMF at any time, e.g., when:
  a. The UE registers with the AMF and one of the S-NSSAIs of the HPLMN which maps to an S-NSSAI in the Requested NSSAI is requiring Network Slice-Specific Authentication and Authorization (see clause 5.15.5.2.1 for details), and can be added to the Allowed NSSAI by the AMF once the Network Slice-Specific Authentication and Authorization for the S-NSSAI succeeds; or
  b. The Network Slice-Specific AAA Server triggers a UE re-authentication and re-authorization for an S-NSSAI; or
  c. The AMF, based on operator policy or a subscription change, decides to initiate the Network Slice-Specific Authentication and Authorization procedure for a certain S-NSSAI which was previously authorized.

In the case of re-authentication and re-authorization (b. and c. above) the following applies:
  If S-NSSAIs that are requiring Network Slice-Specific Authentication and Authorization are included in the Allowed NSSAI for each Access Type, AMF selects an Access Type to be used to perform the Network Slice Specific Authentication and Authorization procedure based on network policies.
  If the Network Slice-Specific Authentication and Authorization for some S-NSSAIs in the Allowed NSSAI is unsuccessful, the AMF shall update the Allowed NSSAI for each Access Type to the UE via UE Configuration Update procedure.
  If the Network Slice-Specific Authentication and Authorization fails for all S-NSSAIs in the Allowed NSSAI, the AMF shall execute the Network-initiated Deregistration procedure described in the 3GPP standard specification, and shall include in the explicit De-Registration Request message the list of Rejected S-NSSAIs, each of them with the appropriate rejection cause value."

It is apparent from the above that the pending NSSAI as defined in the 3GPP standard specification is provided by the serving PLMN during a registration procedure, indicating the S-NSSAI(s) for which the network slice-specific authentication and authorization procedure is pending.

The total number of S-NSSAI(s) in the:

Allowed NSSAI (A-NSSAI) and Rejected NSSAI cannot exceed 8, and

Pending NSSAI (P-NSSAI) and Configured NSSAI (C-NSSAI) cannot exceed 16.

Overview of 5GSM Secondary Authentication

The 5GSM secondary authentication procedure is defined in the 3GPP standard specification. It enables a data network (DN) to (re)-authenticate and (re)-authorize the upper layers of the UE when the UE establishes a PDU session. The procedure can be performed during or after the UE-requested PDU session procedure establishing a non-emergency PDU session. The procedure is initiated by the SMF and involves the network authenticating the UE using the extensible authentication protocol (EAP) as specified in IETF RFC 3748. The 3GPP standard specification gives a detailed overview of the exchange of EAP messages involved in 5GSM secondary authentication. The exchange of EAP messages occurs between the UE acting as the EAP client and the DN-AAA server acting as the EAP server.

The above information is presented as background information only to assist with an understanding of the present disclosure. No determination has been made, and no assertion is made, as to whether any of the above might be applicable as prior art with regard to the present disclosure.

SUMMARY

It is an aim of certain examples of the present disclosure to address, solve and/or mitigate, at least partly, at least one of the problems and/or disadvantages associated with the related art, for example at least one of the problems and/or disadvantages described herein. It is an aim of certain examples of the present disclosure to provide at least one advantage over the related art, for example at least one of the advantages described herein.

The present disclosure is defined in the independent claims. Advantageous features are defined in the dependent claims.

Embodiments or examples disclosed in the description and/or figures falling outside the scope of the claims are to be understood as examples useful for understanding the present disclosure.

Various aspects, advantages, and salient features will become apparent to those skilled in the art from the following detailed description, taken in conjunction with the annexed drawings, which disclose examples of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description of examples of the present disclosure, with reference to the accompanying drawings, is provided to assist in a comprehensive understanding of the present disclosure, as defined by the claims. The description includes various specific details to assist in that understanding but these are to be regarded as merely exemplary. Accordingly, those of ordinary skill in the art will recognize that various changes and modifications of the examples described herein can be made without departing from the scope of the disclosure. The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present disclosure.

The terms and words used herein are not limited to the bibliographical or standard meanings, but are merely used to enable a clear and consistent understanding of the disclosure.

Herein, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

Herein, the singular form, for example "a", "an" and "the", encompasses the plural unless the context otherwise requires. For example, reference to "an object" includes reference to one or more of such objects.

Herein, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/or groups thereof described or disclosed in conjunction with a particular aspect, embodiment, example or claim of the present disclosure are to be understood to be applicable to any other aspect, embodiment, example or claim described herein unless incompatible therewith.

Certain examples of the present disclosure provide methods, apparatus and systems for performing authentication and authorization in a network. The following examples are applicable to, and use terminology associated with, 3GPP 5G. For example, certain examples of the present disclosure provide methods, apparatus and systems for performing NSSAA in 3GPP 5G. However, the skilled person will appreciate that the techniques disclosed herein are not limited to these examples or to 3GPP 5G and may be applied in any suitable system or standard, for example one or more existing and/or future generation wireless communication systems or standards.

For example, the functionality of the various network entities and other features disclosed herein may be applied to corresponding or equivalent entities or features in other communication systems or standards. Corresponding or equivalent entities or features may be regarded as entities or features that perform the same or similar role, function, operation or purpose within the network. For example, the functionality of an AMF in the examples below may be applied to any other suitable type of entity performing access and mobility management functions, and the functionality of an SMF in the examples below may be applied to any other suitable type of entity performing session management functions.

The skilled person will appreciate that the present disclosure is not limited to the specific examples disclosed herein. For example:

The techniques disclosed herein are not limited to 3GPP 5G;

One or more entities in the examples disclosed herein may be replaced with one or more alternative entities performing equivalent or corresponding functions, processes or operations;

One or more of the messages in the examples disclosed herein may be replaced with one or more alternative messages, signals or other type of information carriers that communicate equivalent or corresponding information;

One or more further elements, entities and/or messages may be added to the examples disclosed herein;

One or more non-essential elements, entities and/or messages may be omitted in certain examples;

The functions, processes or operations of a particular entity in one example may be divided between two or more separate entities in an alternative example;

The functions, processes or operations of two or more separate entities in one example may be performed by a single entity in an alternative example;

Information carried by a particular message in one example may be carried by two or more separate messages in an alternative example;

Information carried by two or more separate messages in one example may be carried by a single message in an alternative example;

The order in which operations are performed may be modified, if possible, in alternative examples; and The transmission of information between network entities is not limited to the specific form, type and/or order of messages described in relation to the examples disclosed herein.

Certain examples of the present disclosure may be provided in the form of an apparatus/device/network entity configured to perform one or more defined network functions and/or a method therefor. Certain examples of the present disclosure may be provided in the form of a system (e.g., a network) comprising one or more such apparatuses/devices/network entities, and/or a method therefor. For example, in the following examples, a network may include a UE, AMF and an SMF.

At least the following problems exist in view of the related art:

1. Handling of Pending NSSAI and Allowed NSSAI

As discussed above, if the registration area contains TAIs belonging to different PLMNs, which are equivalent PLMNs, the UE stores the received allowed NSSAI for the registered PLMN and separately for each of the equivalent PLMNs. However, when the network performs NSSAA at the time of registration, and the network sends back a pending NSSAI to the UE, the UE may only store this pending NSSAI for the registered PLMN only.

Observation 1: The UE may have a pending NSSAI stored against the RPLMN only but may not have a pending NSSAI stored against any EPLMNs.

If the allowed NSSAI consisted of S-NSSAI-1 and the UE performs a mobility and periodic registration update in the RPLMN which triggers NSSAA on S-NSSAI-1, then the AMF sends a pending NSSAI back to the UE containing S-NSSAI-1 and the UE stores the pending NSSAI.

Observation 2: The UE may have S-NSSAI-1 stored in the pending NSSAI and allowed NSSAI at the same time for the RPLMN which is not allowed.

Additionally, if the TAI list of the registration area contained PLMNs equivalent to the registered PLMN, then as the RPLMN only stores the pending NSSAI, but stores the allowed NSSAI for the RPLMN and the EPLMNs, the UE (in 5GMM-CONNECTED mode with RRC-inactive indication) could perform cell reselection to a EPLMN and be able to access services for S-NSSAI-1 which is undergoing NSSAA.

Observation 3: The UE could get access to the services of an S-NSSAI in an EPLMN when that S-NSSAI is undergoing NSSAA for the RPLMN.

2. Stopping 5GSM Back-Off Timer Due to 5GSM Secondary Authentication

5GSM congestion control is specified in the 3GPP standard specifications. There are three types of congestion control back-off timers described. For DNN based congestion control the SMF can request the UE to start the back-off timer T3396. For S-NSSAI based congestion control, the SMF can request the UE to start the back-off timer T3585. For S-NSSAI and DNN based congestion control, the SMF can request the UE to start the back-off timer T3584. Whenever the network sends a downlink NAS message and the back-off timer is running, then the UE shall stop the back-off timer and process the network-initiated message.

One problem is that, in the 3GPP standard specification, there is no mention of stopping the back-off timers when the UE receives the PDU SESSION AUTHENTICATION COMMAND.

Figure 2:
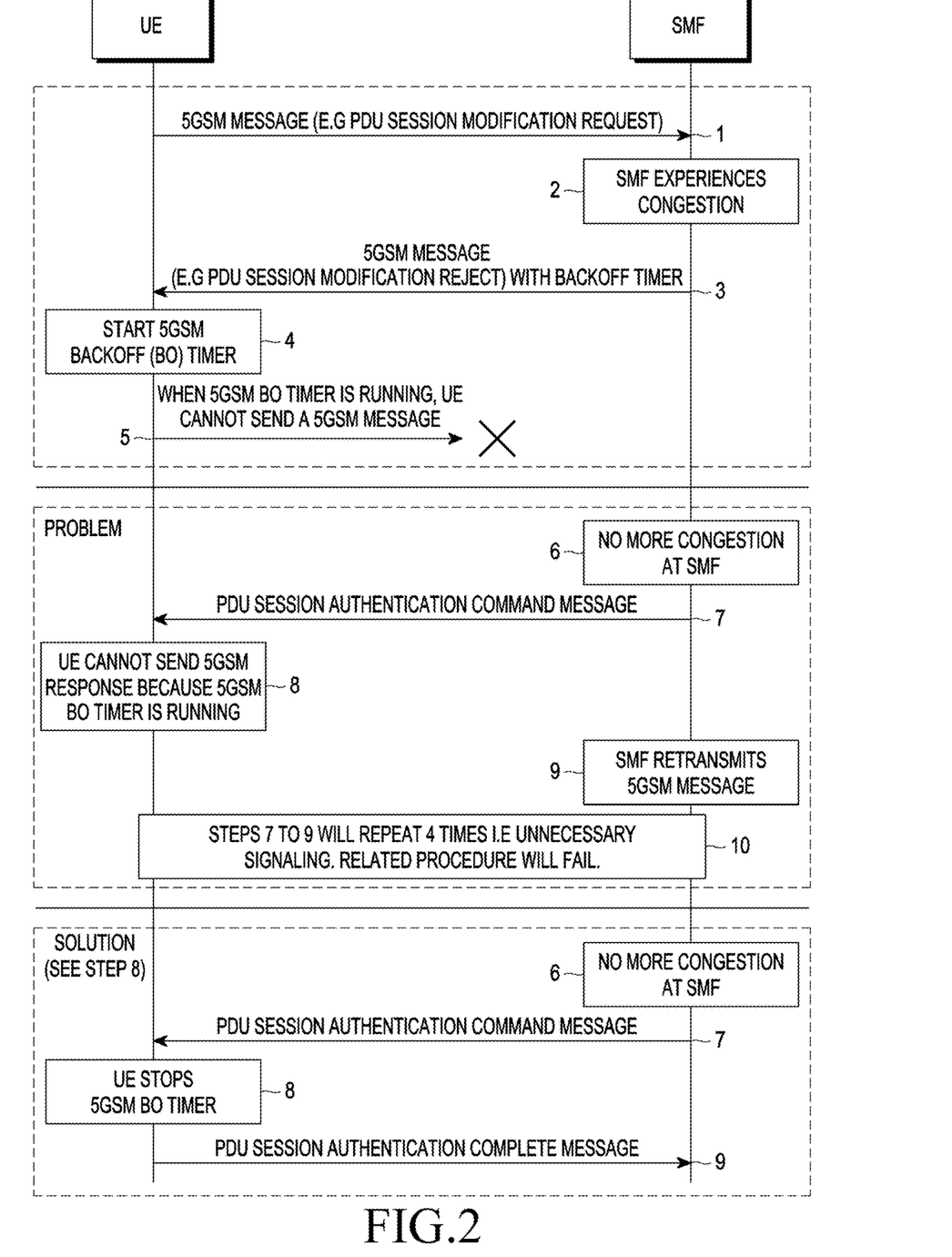
FIG. 2 is a flow diagram illustrating a problem relating to a back-off timer and a solution according to certain examples of the present disclosure.

The upper two thirds of FIG. 2 illustrate a problem relating to a back-off (BO) timer. In step 1, a UE transmits a message (e.g., PDU session modification request) to SMF. In step 2, SMF experiences congestion. In step 3, SMF transmits a message (e.g., PDU session modification reject) with one or more BO timer indications to UE. In step 4, the UE starts one or more corresponding BO timers. As illustrated in step 5, when the BO timer(s) is/are running, the UE cannot send a message. In step 6, there is no more congestion at SMF. In step 7, SMF transmits a PDU session authentication command message to the UE. As illustrated in step 8, the UE cannot send a response to the PDU session authentication command message because the BO timer(s) is/are running. Accordingly, in step 9, SMF retransmits the message of step 7. This results in a problem, as illustrated in step 10, that steps 7-9 may repeat a number of times, resulting in unnecessary signalling and possible failure of the related procedure.

3. Current NSSAA Procedure May Block Location Services

When the network does not provide an allowed NSSAI to the UE in the registration accept message, the UE is not supposed to initiate requests, e.g., a service request, to get services except if the service is related to an emergency services or the UE is a high priority UE, etc. This behavior is expected since the restrictions to get services are directly related to access to a slice via an SMF.

However, there are certain services that the UE may get that are not related to a slice, e.g., location services. As such, the UE may be allowed to get such services when no allowed NSSAI is available. This behavior is currently missing, thereby making it impossible for a UE to get location services which are not related to NSSAA.

In view of the above problems, certain examples of the present disclosure provide one or more of the following solutions.

1. Handling of Pending NSSAI and Allowed NSSAI

Certain examples of the present disclosure store the pending NSSAI for each of the equivalent PLMNs where the registration area includes TAIs from these equivalent PLMNs.

In certain examples of the present disclosure, when the UE stores the pending NSSAI, the UE removes from the allowed NSSAI any S-NSSAI(s) in the pending NSSAI.

In certain examples of the present disclosure, the UE removes the S-NSSAIs from the stored allowed NSSAIs for PLMNs equivalent to the registered PLMN.

In certain examples, when the UE's registration area contains TAIs for equivalent PLMNs, the UE also applies the pending NSSAI to the equivalent PLMNs.

In certain examples, if the registration area contains TAIs belonging to different PLMNs, which are equivalent PLMNs, then for each of the equivalent PLMNs, the UE may replace any stored pending NSSAI with the pending NSSAI received in the registered PLMN.

In certain examples, if the registration accept is received with a pending NSSAI, and the registration area contains equivalent PLMNs, then the UE may also store the pending NSSAI for the equivalent PLMNs.

Accordingly, in certain examples, when the UE receives the pending NSSAI from the network and stores the pending NSSAI for the registered PLMN (RPLMN), if the registration area contains TAIs belonging to different PLMNs, which are equivalent PLMNs, the UE additionally stores the received pending NSSAI for each of the equivalent PLMNs. If the UE does not store the pending NSSAI for the equivalent PLMNs (but stores the allowed NSSAI for the EPLMNs), the UE (e.g., in 5GMM-CONNECTED mode with RRC-inactive indication) could perform cell reselection to an EPLMN and be able to access services for an S-NSSAI which is undergoing NSSAA.

2. Stopping 5GSM Back-Off Timer Due to 5GSM Secondary Authentication

Certain examples of the present disclosure operate according to added normative conditions to TS 24.501 to stop the back-off timers T3396, T3584 and T3485 running in the UE when the UE receives the PDU SESSION AUTHENTICATION COMMAND.

In certain examples, for the 5GSM secondary authentication procedure, when the UE receives the PDU SESSION AUTHENTICATION COMMAND, the UE stops the back-off timer(s) if the back-off timer(s) are running.

The lower third of FIG. 2 illustrates a solution according to certain examples of the present disclosure. Steps 6-9 of the lower third of FIG. 2 replace steps 6-10 of the middle third of FIG. 2. In step 6, there is no more congestion at SMF. In step 7, SMF transmits a message (e.g., a PDU session authentication command message) to a UE. In step 8, the UE stops the one or more BO timers. Accordingly, in step 9, UE may transmit a message (e.g., a PDU session authentication complete message) to SMF to perform/complete the related procedure.

3. Allowing Other Services During NSSAA when No Allowed NSSAI is Available

Certain examples of the present disclosure allow other services, such as the transfer of location services message or other types of containers, during NSSAA even if an allowed NSSAI is not available.

Certain examples of the present disclosure allow the AMF to control whether these services can be used or not when no allowed NSSAI is available. The AMF may first indicate that certain services cannot be used during NSSAA if no allowed NSSAI is available. When an allowed NSSAI is available, the AMF can trigger a registration procedure from the UE so that the AMF indicates that these services can now be used.

The skilled person will appreciate that, in relation to all techniques disclosed herein, a situation when no allowed NSSAI is available may be understood as including a situation when a pending NSSAI is sent to the UE, optionally with no allowed NSSAI.

Certain examples of the present disclosure provide a method, for a user equipment (UE) in a wireless communication system, wherein the UE is assigned to a registration area comprising two or more tracking areas (TAs) including at least a first set of TAs belonging to a first public land mobile network (PLMN) to which the UE is registered, the method comprising: in response to a network slice-specific authentication and authorisation (NSSAA) procedure, receiving a pending network slice selection assistance information (NSSAI) including one or more single NSSAI (S-NSSAI); and if the two or more TAs include at least one second set of TAs belonging to at least one second PLMN that is equivalent to the first PLMN, the received pending NSSAI is applicable to the at least one second PLMN in the registration area.

In certain examples, the received pending NSSAI may be applicable to TAs of the at least one second PLMN that can serve the one or more S-NSSAI in the received pending NSSAI. In certain examples, the method may further comprise storing the received pending NSSAI for each of the at least one second PLMN.

In certain examples, storing the pending NSSAI for each of the at least one second PLMN may comprise replacing a previously stored pending NSSAI with the received pending NSSAI for each of the at least one second PLMN.

In certain examples, the pending NSSAI may be received in a NAS message (e.g., a REGISTRATION ACCEPT message).

In certain examples, the received pending NSSAI may be applicable to the first PLMN (e.g., further comprising storing the received pending NSSAI for the first PLMN).

In certain examples, the method may further comprise: receiving an allowed NSSAI including one or more S-NSSAI; and if the two or more TAs include at least one second set of TAs belonging to at least one second PLMN that is equivalent to the first PLMN, the received allowed NSSAI is applicable to the first PLMN and to each of the at least one second PLMN in the registration area.

In certain example, the method may further comprise storing the received allowed NSSAI for the first PLMN and for each of the at least one second PLMN.

In certain examples, the method may further comprise receiving a set of TAs that can serve all S-NSSAI in the allowed S-NSSAI.

In certain examples, the received set of TAs may include one or more TAs of the first PLMN and one or more TAs of the at least one second PLMN. Certain examples of the present disclosure provide a method, for a user equipment (UE) in a wireless communication system, the method comprising: starting a back-off timer (e.g., T3396, T3584, T3585) in response to receiving a first message (e.g., a 5GSM message); receiving a second message (e.g., PDU SESSION AUTHENTICATION COMMAND message) for a procedure for authentication of the UE when establishing or participating in a data session (e.g., a PDU session); stopping the back-off timer in response to the second message; and transmitting a third message (e.g., a PDU SESSION AUTHENTICATION COMPLETE message) in response to the second message.

In certain examples, stopping the back-off timer may comprise, if the UE provided a single network slice selection assistance information (S-NSSAI) and a data network name (DNN) during the PDU session establishment, stopping the timer (e.g., T3584), if the timer is running for the same [S-NSSAI, DNN] combination provided by the UE.

In certain examples, stopping the back-off timer may comprise, if the UE did not provide an S-NSSAI during the PDU session establishment, stopping the timer (e.g., T3584), if the timer is running for the same [no S-NSSAI, DNN] combination provided by the UE.

In certain examples, stopping the back-off timer may comprise, if the UE did not provide a DNN during the PDU session establishment, stopping the timer (e.g., T3584), if the timer is running for the same [S-NSSAI, no DNN] combination provided by the UE.

In certain examples, stopping the back-off timer may comprise, if the UE provided neither an S-NSSAI nor a DNN during the PDU session establishment, stopping the timer (e.g., T3584), if the timer is running for the same [no S-NSSAI, no DNN] combination provided by the UE.

In certain examples, stopping the back-off timer may comprise, if the UE provided a data network name (DNN) during the PDU session establishment, stopping the timer (e.g., T3396), if the timer is running for the DNN provided by the UE.

In certain examples, stopping the back-off timer may comprise, if the UE did not provide a DNN during the PDU session establishment, stopping the timer (e.g., T3396) associated with no DNN if the timer is running.

In certain examples, stopping the back-off timer may comprise, if the UE provided an S-NSSAI during the PDU session establishment, stopping the timer (e.g., T3585), if the timer is running for the S-NSSAI provided by the UE.

In certain examples, stopping the back-off timer may comprise, if the UE did not provide an S-NSSAI during the PDU session establishment, stopping the timer (e.g., T3585) associated with no S-NSSAI if the timer is running.

In certain examples, stopping the back-off timer may comprise, if the UE did not provide a DNN, stopping the timer (e.g., T3396) that corresponds to a DNN which the UE considers to be associated with the PDU session, if the timer is running.

In certain examples, the UE may consider the DNN to be associated with the PDU session based on a value (e.g., a DNN value) that is returned by a network entity (e.g., an SMF entity) in a message (e.g., a PDU session establishment accept message or a PDU session modification accept message).

In certain examples, stopping the back-off timer may comprise, if the UE did not provide a [S-NSSAI, DNN] combination, stopping the timer (e.g., T3584) that corresponds to a [S-NSSAI, DNN] combination which the UE considers to be associated with the PDU session, if the timer is running.

In certain examples, the UE may consider a [S-NSSAI, DNN] combination to be associated with the PDU session based on a value (e.g., a [S-NSSAI, DNN] combination value) that is returned by a network entity (e.g., an SMF entity) in a message (e.g., a PDU session establishment accept message or a PDU session modification accept message).

In certain examples, stopping the back-off timer may comprise, if the UE did not provide a S-NSSAI, stopping the timer (e.g., T3585) that corresponds to an S-NSSAI which the UE considers to be associated with the PDU session, if the timer is running.

In certain examples, the UE may consider an S-NSSAI to be associated with the PDU session based on a value (e.g., an S-NSSAI value) that is returned by a network entity (e.g., an SMF entity) in a message (e.g., a PDU session establishment accept message or a PDU session modification accept message), or based on a value (e.g., an S-NSSAI value) that is considered to be associated with the PDU session after a mobility to a target 5GS system of a VPLMN.

In certain examples, the procedure for authentication of the UE may comprise 5GSM Secondary Authentication.

In certain examples, the stopping of the back-off timer is not transparent to the 5GSM layer of the UE.

Certain examples of the present disclosure provide a method, for a user equipment (UE) in a network, the method comprising: determining that the UE does not have an allowed NSSAI; and initiating or performing a procedure if a condition is satisfied, wherein the condition comprises: the procedure relates to a predefined type of service, transmission of data of a predefined type, and/or transmission of a NAS message.

In certain examples, the method may further comprise receiving, from a network entity (e.g., an AMF entity), a message (e.g., NAS message), wherein one or more of: the message is received during an NSSAA procedure; the message is a registration accept message; the message indicates that NSSAA is to be performed; the message does not include an allowed NSSAI; and the message includes a pending NSSAI.

In certain examples, initiating or performing the procedure may comprise sending (e.g., to an AMF entity) a service request message, a control plane service request message, or a NAS message (e.g., an UL NAS TRANSPORT message).

In certain examples, the condition may further comprise: an indication (e.g., 5G-LCS bit of 5GS network feature support IE set to "location services via 5GC supported"), that the procedure is supported, is received (e.g., from an AMF entity), a predefined default behaviour allows the procedure to be initiated or performed when the UE does not have an allowed NSSAI, an indication (e.g., a predetermined bit of a 5GS network feature support IE set to a first predetermined value), that the procedure is allowed, optionally when the UE does not have an allowed NSSAI, is received (e.g., from an AMF entity), and/or an indication (e.g., a predetermined bit of the 5GS network feature support IE set to a second predetermined value), that the procedure is not allowed, optionally when the UE does not have an allowed NSSAI, is not received.

In certain examples, the predefined type of service may be a service not associated with a PDU session, and/or the data of a predefined type may be data not associated with a PDU session.

In certain examples, the predefined type of service may comprise a location service.

In certain examples, the predefined type of data may comprise one or more of: SMS; LPP message; SOR transparent container; a predetermined type of container; or UE parameters update transparent container.

In certain examples, the condition may further comprise: a message (e.g., a DL NAS TRANSPORT message) related to the procedure (e.g., sending an UL NAS TRANSPORT message) is received from a network entity (e.g., an AMF entity).

In certain examples, the method may further comprise: receiving an allowed NSSAI from a network entity (e.g., an AMF entity); receiving one or more messages from a network entity (e.g., an AMF entity); and in response to receiving (e.g., from an AMF entity) at least a first message (e.g., a configuration update command), performing a registration procedure for initiating or performing the procedure.

In certain examples, the first message may include an indication that registration is requested.

In certain examples, the one or more messages may comprise a second message (e.g., a registration accept message).

In certain examples, at least one of the messages (e.g., the first message or the second message) may include an indication that the procedure is allowed, available and/or supported.

In certain examples, the allowed NSSAI may be received in at least one of the messages (e.g., the first message or the second message).

Certain examples of the present disclosure provide a method, for a network entity (e.g., an AMF entity) in a network comprising the entity and a user equipment (UE), the method comprising: determining that the UE does not have an allowed NSSAI; and transmitting, to the UE, a first message indicating whether or not a certain procedure is allowed, available or supported when the UE does not have an allowed NSSAI, wherein the procedure relates to a predefined type of service, transmission of data of a predefined type, and/or transmission of a NAS message.

In certain examples, the first message may indicate that the procedure is not allowed, not available and/or not supported when the UE does not have an allowed NSSAI.

In certain examples, the method may further comprise: determining that the UE has an allowed NSSAI; and transmitting, to the UE, one or more messages including a second message indicating that the procedure is allowed, available and/or supported.

In certain examples, the one or more messages may comprise a message (e.g., a configuration update command message) for triggering the UE to perform a registration procedure for initiating or performing the procedure.

In certain examples, the method may further comprise transmitting, to the UE, the allowed NSSAI.

In certain examples, the allowed NSSAI may be transmitted to the UE in the second message.

Certain examples of the present disclosure provided a first network entity e.g., UE, AMF entity and/or SMF entity) configured to operate according to a method according to any example, embodiment, aspect and/or claim disclosed herein.

Certain examples of the present disclosure provide a second network entity (e.g., UE, AMF entity and/or SMF entity) configured to cooperate with a first network entity of the preceding examples according to any example, embodiment, aspect and/or claim disclosed herein.

Certain examples of the present disclosure provide a network (or wireless communication system) comprising a UE and one or more further network entities according to any example, embodiment, aspect and/or claim disclosed herein.

Certain examples of the present disclosure provide a computer program comprising instructions which, when the program is executed by a computer or processor, cause the computer or processor to carry out a method according to any example, embodiment, aspect and/or claim disclosed herein.

Certain examples of the present disclosure provide a computer or processor-readable data carrier having stored thereon a computer program according to the preceding examples.

Certain examples of the present disclosure will now be described in more detail.

1. Handling of Pending NSSAI and Allowed NSSAI

To address the issue described in observation 1 above, certain examples of the present disclosure may store the pending NSSAI for each of the equivalent PLMNs where the registration area consists of TAIs from these equivalent PLMNs. To address the issue described in observation 3 above, in certain examples of the present disclosure, the UE (also) removes the S-NSSAIs from the stored allowed NSSAIs for PLMNs equivalent to the registered. In such cases, when the UE receives the REGISTRATION ACCEPT in the current PLMN containing the pending NSSAI, then for each of the equivalent PLMNs, the UE may replace any stored pending NSSAI with the pending NSSAI received in the registered PLMN, and for each and every access type remove from the stored allowed NSSAI, the, S-NSSAI(s), if any, included in the pending NSSAI. For example:

- For observation 1, certain examples of the present disclosure may operate according to normative statement 1) added to the 3GPP standard specification as shown below: and
- For observation 3, certain examples of the present disclosure may operate according to normative statement 2) added to the 3GPP standard specification as shown in TABLE 5.

TABLE 5

When the network slice-specific authentication and authorization procedure is to be initiated for one or more S-NSSAIs in the requested NSSAI, these S-NSSAI(s) will be included in the pending NSSAI. When the network slice-specific authentication and authorization procedure is completed for an S-NSSAI that has been in the pending NSSAI, the S-NSSAI will be moved to the allowed NSSAI or rejected NSSAI depending on the outcome of the procedure and communicated to the UE. The pending NSSAI is managed regardless of access type i.e., the pending NSSAI is applicable to both 3GPP access and non-3GPP access even if sent over only one of the accesses. If the registration area contains TAIs belonging to different PLMNs, which are equivalent PLMNs, the pending NSSAI is applicable to these PLMNs in this registration area.

d) When the UE receives one or more S-NSSAIs included in pending NSSAI in the REGISTRATION ACCEPT message, the UE shall store one or more S-NSSAIs for the pending NSSAI.

If the registration area contains TAIs belonging to different PLMNs, which are equivalent PLMNs, then for each of the equivalent PLMNs, the UE shall:

1) replace any stored pending NSSAI with the pending NSSAI received in the registered PLMN;
2) for each and every access type remove from the stored allowed NSSAI, the, S-NSSAI(s), if any, included in the pending NSSAI.

When the UE:

1) deregisters with the current PLMN using explicit signalling or enters state 5GMM-DEREGISTERED for the current PLMN;
2) successfully registers with a new PLMN;
3) enters state 5GMM-DEREGISTERED following an unsuccessful registration with a new PLMN;

TABLE 5-continued 4) successfully completes an attach or tracking area update procedure in S1 mode; or
5) initiates attach or tracking area update procedure in S1 mode and receives an ATTACH REJECT or TRACKING AREA UPDATE REJECT;
   and the UE is not registered with the current PLMN over another access, the pending NSSAI for the current PLMN shall be deleted; and
The UE receiving the pending NSSAI in the REGISTRATION ACCEPT message shall store the S-NSSAI in the pending NSSAI as specified in subclause the 3GPP standard specification. If the registration area contains TAIs belonging to different PLMNs, which are equivalent PLMNs, the UE shall store the received pending NSSAI for each of the equivalent PLMNs as specified in the 3GPP standard specification.

To address the issue described in observation 2 above, in certain examples of the present disclosure, when the UE stores the pending NSSAI, the UE removes from the allowed NSSAI any S-NSSAI(s) in the pending NSSAI. For example, certain examples of the present disclosure may operate according to normative statement 2) added to the 3GPP standard specification as shown in TABLE 6 below.

TABLE 6 d) When the UE receives one or more S-NSSAIs included in pending NSSAI in the REGISTRATION ACCEPT message, the UE shall:
   1) store one or more S-NSSAIs for the pending NSSAI;
   2) for each and every access type, remove from the stored allowed NSSAI for the current PLMN or SNPN, the S-NSSAI(s), if any, included in the pending NSSAI;

Certain examples of the present disclosure may operate in accordance with the modified subclauses indicated above.

In the above, the skilled person would understand that, when an NSSAI (e.g., a pending NSSAI or an allowed NSSAI) is applicable to a PLMN in a registration area, this may be regarded as equivalent to: applying the pending NSSAI to the PLMN in the registration area; or considering the pending NSSAI to be applicable to the PLMN in the registration area. When an NSSAI (e.g., a pending NSSAI or an allowed NSSAI) is applicable to a PLMN, or to at least two PLMN, the NSSAI may be stored for the PLMN, or for each PLMN.

The skilled person will appreciate that a pending NSSAI may be received in any suitable type of message. For example, a pending NSSAI may be received in any NAS message, not limited to a REGISTRATION ACCEPT message.

2. Stopping 5GSM Back-Off Timer Due to 5GSM Secondary Authentication

To address the issue with the UE stopping the back-off timer on receipt of the PDU SESSION AUTHENTICATION COMMAND discussed above, certain examples of the present disclosure may operate according to the normative statements introduced to the 3GPP standard specification as shown in TABLE 7 below.

TABLE 7

6.3.1.2.1 PDU EAP message reliable transport procedure initiation
In order to initiate the PDU EAP message reliable transport procedure, the SMF shall create a PDU SESSION AUTHENTICATION COMMAND message.
The SMF shall set the PTI IE of the PDU SESSION AUTHENTICATION COMMAND message to "No procedure transaction identity assigned".
The SMF shall set the EAP message IE of the PDU SESSION AUTHENTICATION COMMAND message to the EAP-request message provided by the DN or generated locally.
The SMF shall send the PDU SESSION AUTHENTICATION COMMAND message, and the SMF shall start timer T3590 (see example in FIG. 6.3.1.1).

TABLE 7-continued

Upon receipt of the PDU SESSION AUTHENTICATION COMMAND message, if the UE
provided a DNN during the PDU session establishment, the UE shall stop timer T3396, if it
is running for the DNN provided by the UE or for the DNN that is associated with the PDU
session that is identified by the PDU session ID. Optionally, if the UE did not provide a DNN
during the PDU session establishment, the UE shall stop the timer T3396 associated with no
DNN if it is running. Optionally, even if the UE did not provide a DNN, the UE may consider
that a particular DNN is associated with the PDU session e.g., based on a DNN value that is
returned by the SMF in the PDU Session Establishment Accept message (or PDU Session
Modification Accept message). In this case, the UE shall stop the timer T3396 that
corresponds to the DNN which the UE considers to be associated with the PDU session, if it
is running.
Upon receipt of the PDU SESSION AUTHENTICATION COMMAND message, if the UE
provided an S-NSSAI and a DNN during the PDU session establishment, the UE shall stop
timer T3584, if it is running for the same [S-NSSAI, DNN] combination provided by the UE
or for the [S-NSSAI, DNN] that is associated with the PDU session that is identified by the
PDU session ID. Optionally, if the UE did not provide an S-NSSAI during the PDU session
establishment, the UE shall stop timer T3584, if it is running for the same [no S-NSSAI,
DNN] combination provided by the UE. If the UE provided neither a DNN nor an S-NSSAI
during the PDU session establishment, the UE shall stop timer T3584, if it is running for the
same [no S-NSSAI, no DNN] combination provided by the UE. Optionally, even if the UE
did not provide a [S-NSSAI, DNN] combination, the UE may consider that a particular [S-
NSSAI, DNN] combination is associated with the PDU session e.g., based on a [S-NSSAI,
DNN] combination value that is returned by the SMF in the PDU Session Establishment
Accept message (or PDU Session Modification Accept message). In this case, the UE shall
stop the timer T3584 that corresponds to the [S-NSSAI, DNN] combination which the UE
considers to be associated with the PDU session, if it is running.
Upon receipt of the PDU SESSION AUTHENTICATION COMMAND message, if the UE
provided an S-NSSAI during the PDU session establishment, the UE shall stop timer T3585,
if it is running for the S-NSSAI provided by the UE. If the UE did not provide an S-NSSAI
during the PDU session establishment, the UE shall stop the timer T3585 associated with no
S-NSSAI if it is running. Optionally, even if the UE did not provide an S-NSSAI, the UE
may consider that a particular S-NSSAI is associated with the PDU session e.g., based on an
S-NSSAI value that is returned by the SMF in the PDU Session Establishment Accept
message (or PDU Session Modification Accept message), or based on an S-NSSAI value that
is considered to be associated with the PDU session e.g., after a mobility to a target 5GS
system of a VPLMN (optionally from EPS i.e., S1 mode, or from a source 5GS system of
another VPLMN). In this case, the UE shall stop the timer T3585 that corresponds to the S-
NSSAI which the UE considers to be associated with the PDU session, if it is running.
NOTE 1: Upon receipt of the PDU SESSION AUTHENTICATION COMMAND message
for a PDU session, if the UE provided a DNN (or no DNN) and an S-NSSAI (or no
S-NSSAI) when the PDU session is established, timer T3396 associated with the
DNN (or no DNN, if no DNN was provided by the UE) is running, and timer T3584
associated with the DNN (or no DNN, if no DNN was provided by the UE) and the
S-NSSAI (or no S-NSSAI, if no S-NSSAI was provided by the UE) is running, then
the UE stops both the timer T3396 and the timer T3584.
NOTE 2: Upon receipt of the PDU SESSION AUTHENTICATION COMMAND message
for a PDU session, if the UE provided a DNN (or no DNN) and an S-NSSAI (or no
S-NSSAI) when the PDU session is established, timer T3585 associated with the S-
NSSAI (or no S-NSSAI, if no S-NSSAI was provided by the UE) is running, and
timer T3584 associated with the DNN (or no DNN, if no DNN was provided by the
UE) and the S-NSSAI (or no S-NSSAI, if no S-NSSAI was provided by the UE) is
running, then the UE stops both the timer T3585 and the timer T3584.
Upon receipt of a PDU SESSION AUTHENTICATION COMMAND message and a PDU
session ID, using the NAS transport procedure as specified in subclause 5.4.5, the UE passes
to the upper layers the EAP message received in the EAP message IE of the PDU SESSION
AUTHENTICATION COMMAND message. Apart from this action and the stopping of
timers T3396, T3584 and T3485, the authentication and authorization procedure initiated by
the DN is transparent to the 5GSM layer of the UE.

Certain examples of the present disclosure may operate in accordance with the modified subclause indicated above.

3. Allowing Other Services e.g., Location Services, During NSSAA

In certain examples of the present disclosure, during any NSSAA procedure, if the UE receives any NAS message, e.g., registration accept message, optionally with the "NSSAA to be performed" indicator set to "network slice-specific authentication and authorization is to be performed," and optionally with no allowed NSSAI, and optionally with a pending NSSAI, the UE may determine that the UE can initiate the relevant NAS procedures to send location services message if the "5G-LCS" bit of the 5GS network feature support IE is set to "location services via 5GC supported."

Hence, in certain examples of the present disclosure, during NSSAA, if the UE does not have an allowed NSSAI, the UE may be allowed to initiate the UE-initiated NAS transport procedure (i.e., may be allowed to send an UL NAS TRANSPORT message) for the purpose of sending location services message. Similarly, in certain examples of the present disclosure, the UE may be allowed to initiate the service request procedure (i.e., may be allowed to send a service request message, or control plane service request message) to send location services message.

The techniques above may also apply for other types of data that the UE can send with the UL NAS TRANSPORT message, such as, but not limited to, SMS, LPP message, SOR transparent container, UE parameters update transparent container, or any other suitable type of container.

More generally, in certain examples of the present disclosure, for any service or data that is not tied to a PDU session, the UE may be allowed to initiate a service request procedure (e.g., by sending a service request message, or control plane service request message) to send the related data or container (e.g., as listed above) even if the UE does not have an allowed NSSAI. Similarly, in certain examples of the present disclosure, the UE may be allowed to initiate UE-initiated NAS transport procedure (e.g., by sending an UL NAS TRANSPORT message) to send the related data or container (e.g., as listed above) even if the UE does not have an allowed NSSAI.

It is possible that when no allowed NSSAI is available for a UE, based on network policy, the AMF may not want the UE to use any other services even if the other services are not related to slices. To enable this, certain examples of the present disclosure may apply one or more of the following techniques. The service may be any of SMS, location services, etc., or a combination of such services.

For the services that don't have a means by which capability exchange or support can be negotiated between the UE and the network, the default behavior may be fixed to be that such services are allowed. Alternatively, the default behavior may be fixed to be that such services are not allowed. Alternatively, such services may be allowed for the UE only if the UE receives a related service (or message) in a DL NAS TRANSPORT message and for which the UE may be allowed to respond to the service by sending the related data in the UL NAS TRANSPORT message.

For example, the UE parameters update transparent container, etc., may be allowed to be sent by the UE in an UL NAS TRANSPORT message if the UE receives a DL NAS TRANSPORT message containing UE parameters update transparent container.

The skilled person will appreciate that the UE parameters update transparent container is used as an example only, and that the techniques disclosed herein may be applied to other types of services or containers that are sent using the NAS transport procedure.

For services that are only used after a capability or support indication has been negotiated between the UE and the network, e.g., SMS, location services, the UE may determine whether these services can be sent (even if an allowed NSSAI is not received) based on what the network indicates for the corresponding service (or bit position) in the 5GS registration result IE and/or the 5GS network feature support IE.

In certain examples of the present disclosure, if the AMF's policy is such that a service may not be used when the UE does not have an allowed NSSAI, then the AMF may indicate that the service is not allowed or is not supported in the corresponding bit of the appropriate IE in the registration accept message. For example, if the AMF does not want the UE to use location services when no allowed NSSAI can be provided to the UE due to NSSAA, the AMF may set the 5G-LCS' bit of the 5GS network feature support IE is set to "location services via 5GC not supported." The same behavior and technique can also be used for other services, such as SMS, noting that a different bit (i.e., "SMS allowed" bit) in the corresponding IE (i.e., the 5GS registration result IE) would need to be set to the appropriate value (e.g., "SMS over NAS not allowed").

When an allowed NSSAI is available for the UE, the AMF may then use the configuration update command message to trigger a registration procedure from the UE while in 5GMM-CONNECTED mode (referred to as connected mode) so that a corresponding service may be allowed now that an allowed NSSAI is available.

The AMF may also optionally indicate "registration requested" in the "RED" bit of the Configuration update indication IE. The AMF may indicate that the registration procedure may be performed by the UE using the existing NAS signaling connection i.e., without releasing (or waiting for the network to release) the NAS signaling connection. For example, the AMF may use the signaling connection maintain request (SCMR) bit to set the SCMR bit to 1 thereby indicating "release of N1 NAS signaling connection not required." Based on this, the UE may perform a registration procedure in connected mode, i.e., using the current NAS signaling connection (and without releasing the NAS signaling connection or without waiting for the release of the NAS signaling connection by the network). When sending the registration request, the UE may request all the services that the UE needs to use, e.g., SMS, location services, etc., by setting the appropriate bits in the 5GMM capability IE (e.g., the "5G-LCS" bit can be set to indicate "LCS notification mechanisms supported") and/or the 5GS update type IE (e.g., to request the use of SMS by setting the "SMS requested" accordingly).

For example, if the AMF did not allow SMS to be used when an allowed NSSAI was not available, and the AMF now wants to allow the use of SMS for UE given an allowed NSSAI is available, then the AMF may send the configuration update command message and include the SMS indication IE with the SMS availability indication set to "SMS over NAS available." Optionally, the AMF takes the action above when sending the allowed NSSAI to the UE in the configuration update command message. The AMF may also optionally indicate "registration requested" in the "RED" bit of the Configuration update indication IE.

If the AMF did not allow another service, such as the transfer or transport of location services message, when an allowed NSSAI was not available, and the AMF now wants to allow the use of the service, then the AMF may send the configuration update command message to the UE with one or more of the following:

1. The message may indicate "registration requested" in the "RED" bit of the Configuration update indication IE;
2. The message may indicate another IE that would also be used to trigger a registration procedure from connected mode without the release of the NAS signaling connection. For this purpose, an existing IE or a new IE with the relevant information or bit may be used;
3. Optionally, the above actions may be taken by the AMF when sending the new allowed NSSAI in the configuration update command message (i.e., the actions or indications above may be done in the same message that carries the new allowed NSSAI); and
4. Optionally the AMF may indicate, using a bit, whether there has been an update regarding the use of a particular service (or data type) by the network, e.g., where the update may mean e.g., a particular service (or data type) is, or is not allowed, etc. A new bit may be defined for each service (e.g., location service message, LPP, UE policy container, etc.), where this new bit may be defined in a new IE or an existing IE. The AMF may set the corresponding bit to indicate whether the network's allowance of the use of the service has changed (e.g., from not allowed to allowed, or vice versa). Based on this indication, via at least one bit, where optionally the bit is used as explained above for a particular service or data type, the UE may perform a registration procedure (i.e., send a Registration Request message) to request the UE of the particular service that is represented by the bit in question. The UE may send this registration optionally due to the NAS message indicating that a (re-)registration is requested, where optionally the (re-)registration is done by the UE using the existing NAS connection i.e., the UE does not release the connection for the purpose of the (re-)registration by the UE.

Alternatively, the AMF may achieve the above by not providing the new allowed NSSAI using the configuration update command message. The AMF may use any of the actions above to first trigger a registration procedure from the UE in connected mode and then provide the new allowed NSSAI in the registration accept message. In the registration accept message the AMF may also indicate which services are now allowed to be use for the UE given an allowed NSSAI is available. Hence the relevant bits in the relevant IEs may be set accordingly to indicate, e.g., that SMS or location services messages can now be used.

The skilled person will appreciate that the above techniques may be used in any suitable combination.

Figure 3:
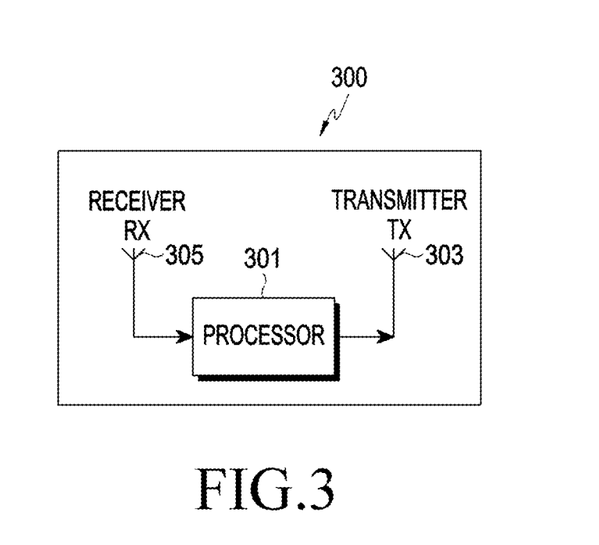
FIG. 3 is a block diagram of an exemplary network entity that may be used in certain examples of the present disclosure.

FIG. 3 is a block diagram of an exemplary network entity that may be used in examples of the present disclosure. For example, a UE, AMF, SMF and/or any other suitable network entity may be provided in the form of the network entity illustrated in FIG. 3. The skilled person will appreciate that the network entity illustrated in FIG. 3 may be implemented, for example, as a network element on a dedicated hardware, as a software instance running on a dedicated hardware, or as a virtualised function instantiated on an appropriate platform, e.g., on a cloud infrastructure.

The entity 300 comprises a processor (or controller) 301, a transmitter 303 and a receiver 305. The receiver 305 is configured for receiving one or more messages or signals from one or more other network entities. The transmitter 303 is configured for transmitting one or more messages or signals to one or more other network entities. The processor 301 is configured for performing one or more operations and/or functions as described above. For example, the processor 301 may be configured for performing the operations of a UE, AMF and/or SMF.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain example provides a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for communication by a user equipment (UE) in a wireless communication system, the method comprising:
   transmitting, to an access and mobility management function (AMF), a registration request message; and
   receiving, from the AMF, a registration accept message related to a registration area, wherein the registration accept message includes pending network slice selection assistance information (NSSAI),
   wherein if the registration area contains tracking area identifiers (TAIs) belonging to different public land mobile networks (PLMNs) which are equivalent PLMNs, the pending NSSAI is applicable to the equivalent PLMNs in the registration area.

2. The method according to claim 1, wherein the pending NSSAI includes one or more single-NSSAIs (S-NSSAIs).

3. The method according to claim 2, wherein the pending NSSAI is applicable to tracking areas (TAs) of at least one PLMN that serves the one or more S-NSSAIs in the pending NSSAI.

4. The method according to claim 1, further comprising:
   if the registration area message contains the TAIs belonging to the different PLMNs which are the equivalent PLMNs, storing the pending NSSAI for each of the equivalent PLMNs.

5. The method according to claim 4, wherein storing the pending NSSAI for each of the equivalent PLMNs comprises replacing any stored pending NSSAI with the pending NSSAI received in the registration accept message.

6. The method according to claim 1, further comprising storing the received pending NSSAI for a first PLMN, wherein the received pending NSSAI is applicable to the first PLMN.

7. A user equipment (UE) for communication in a wireless communication system, the UE comprising:
   a transceiver, and
   a processor, configured to:
      transmit, to an access and mobility management function (AMF), a registration request message; and
      receive, from the AMF, a registration accept message related to a registration area, wherein the registration accept message includes pending network slice selection assistance information (NSSAI),
   wherein, if the registration area contains tracking area identifiers (TAIs) belonging to different public land mobile networks (PLMNs) which are equivalent PLMNs, the pending NSSAI is applicable to the equivalent PLMNs in the registration area.

8. The UE according to claim 7, wherein the pending NSSAI includes one or more single NSSAIs (S-NSSAIs).

9. The UE according to claim 8, wherein the pending NSSAI is applicable to tracking areas (TAs) of at least one PLMN that serves the one or more S-NSSAIs in the pending NSSAI.

10. The UE according to claim 7, wherein the processor is further configured to:

if the registration area message contains the TAIs belonging to the different PLMNs which are the equivalent PLMNs, store the pending NSSAI for each of the equivalent PLMNs; and replace any stored pending NSSAI with the pending NSSAI received in the registration accept message.

* * * * *

UNITED STATES PATENT AND TRADEMARK OFFICE
CERTIFICATE OF CORRECTION

| | | |
|---|---|---|
| PATENT NO. | : 11,924,632 B2 | Page 1 of 1 |
| APPLICATION NO. | : 17/328959 | |
| DATED | : March 5, 2024 | |
| INVENTOR(S) | : Mahmoud Watfa et al. | |

It is certified that error appears in the above-identified patent and that said Letters Patent is hereby corrected as shown below:

In the Claims

Column 24, Claim 4, Line 2, delete "registration area message contains" and insert --registration area contains--
Column 25, Claim 10, Lines 3, delete "registration area message contains" and insert --registration area contains--

Signed and Sealed this
Thirtieth Day of April, 2024

*Katherine Kelly Vidal*
Katherine Kelly Vidal
*Director of the United States Patent and Trademark Office*